E. M. CRUTHERS.
YIELDABLE BEARING AND SUPPORT THEREFOR.
APPLICATION FILED SEPT. 20, 1916. RENEWED NOV. 12, 1918.
1,306,951. Patented June 17, 1919.
2 SHEETS—SHEET 1.
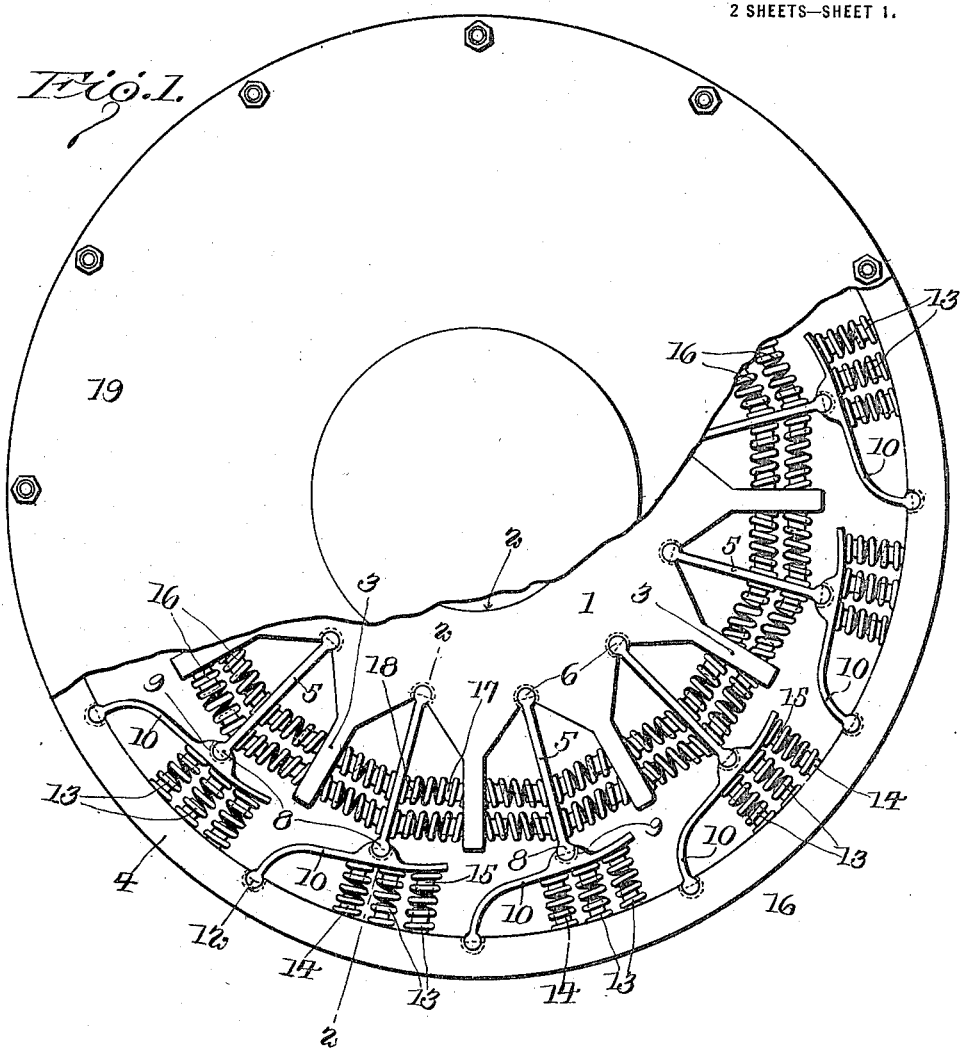
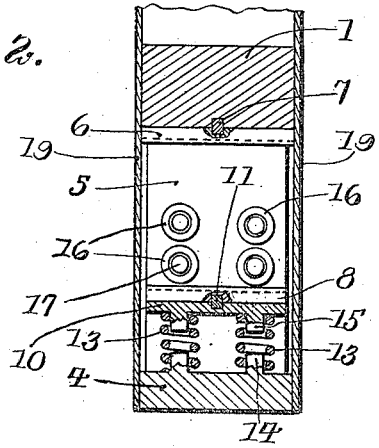

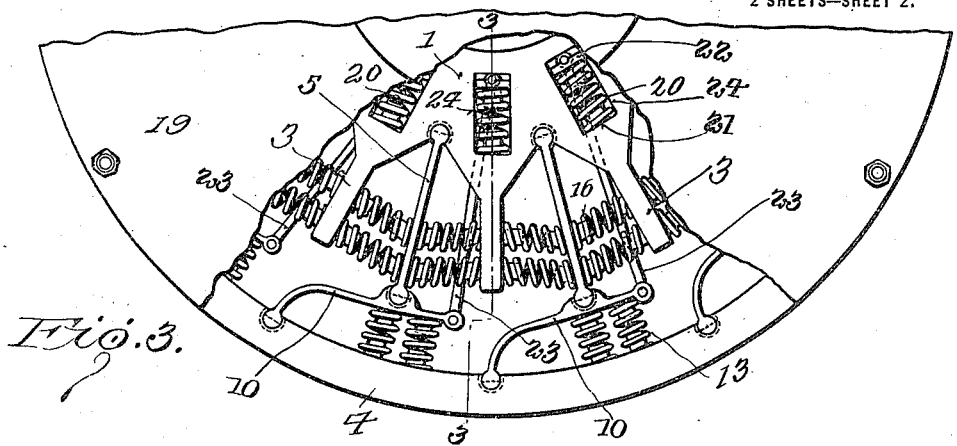
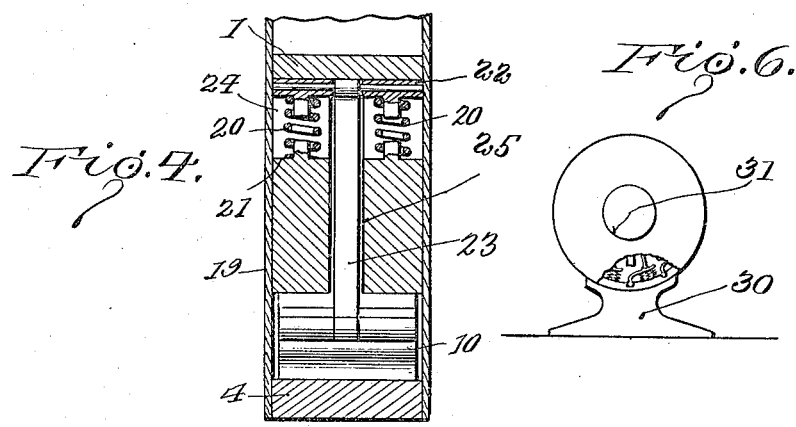
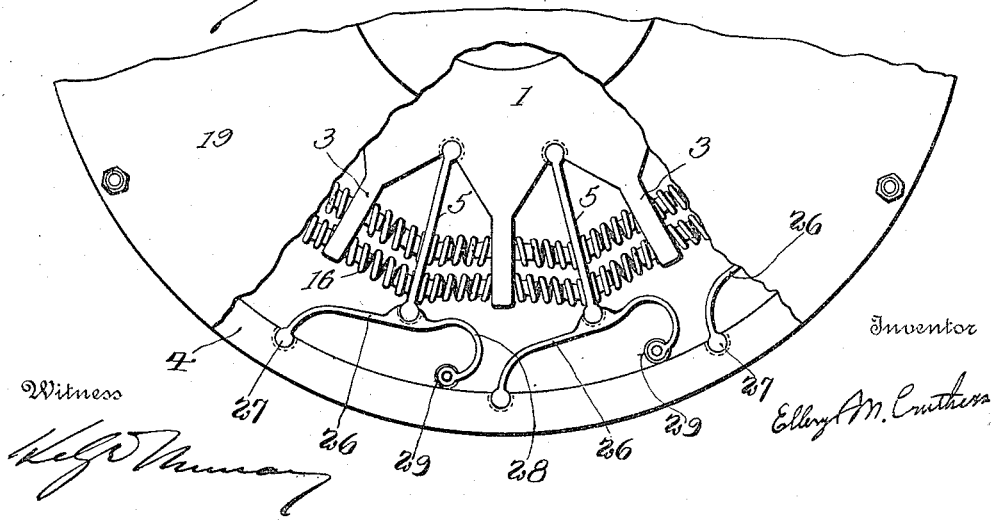

UNITED STATES PATENT OFFICE.

ELLERY M. CRUTHERS, OF LONGMONT, COLORADO, ASSIGNOR OF ONE-THIRD TO CHARLES F. ANDREW AND ONE-THIRD TO F. M. DOWNER.

YIELDABLE BEARING AND SUPPORT THEREFOR.

1,306,951.     Specification of Letters Patent.     Patented June 17, 1919.

Application filed September 20, 1916, Serial No. 121,299. Renewed November 12, 1918. Serial No. 262,222.

*To all whom it may concern:*

Be it known that I, ELLERY M. CRUTHERS, a citizen of the United States, residing at Longmont, in the county of Boulder and State of Colorado, have invented certain new and useful Improvements in Yieldable Bearings and Supports Therefor, of which the following is a specification.

This invention relates to yieldable bearings and supports therefor; and it comprises a new resilient device or bearing member which may be used in producing an elastic relation between a shaft and another member, whether such other member be a wheel or other revolubly mounted device or whether such other member be fixed or stationary and the shaft revolve, such resilient device comprising an annular device of a generally star shape and adapted for engagement with a shaft or axle, an outer or peripheral member and interposed therebetween certain resilient devices comprising rod, arm or plate members pivotally mounted in and connected with said star shaped element and pivotally connected to spring or lever members interposed between their ends and said peripheral member, such arm members being advantageously laterally engaged by movement restraining springs and said lateral springs being advantageously mounted on arm-like prolongations of said star-shaped element and such lever or spring members being advantageously engaged by movement restraining springs mounted on said peripheral member; all as more fully hereinafter set forth and as claimed.

This invention relates more particularly to that class of mechanism wherein shock whether it be transmitted from the interior of the device or the exterior thereof, or vice versa, will be efficiently absorbed in its passage; and it may be employed either as an element of a wheel, such as the road wheels of automobiles and the like, or as a journal bearing for elastically supporting rotary or vibrating shafts and the like. In either relation its function is to absorb and dissipate shock between a central or axle member and a peripheral member, whether such peripheral member be a fixed mounting or a wheel.

This invention is particularly applicable to the production of a floating type of hub bearing support, yieldingly positioned within an outer rim by means of a plurality of specially arranged interposed springs, designed to receive and absorb radial and circumferential shock in a uniform and distributive manner. In its best embodiment it includes an interior annular hub or bearing section provided with a plurality of radial abutments, an outer rim section spaced from the said interior hub section, and means including rocker arms carried by said interior hub section and having their movements with respect to the aforesaid abutments and the outer rim section spring controlled, whereby a yielding connection is provided between the two sections. The bearing section is advantageously a substantially star shaped interior support provided with radial abutments, an outer rim section, radially extending rocker arms carried by the star shaped support and mounted between said abutments, a plurality of lateral springs interposed between the said rocker arms and the aforesaid abutments, another set of springs positioned on the outer rim section, and intermediate connecting lever members interposed between and connected with the last mentioned set of springs and the series of radially disposed rocker arms carried by the star shaped support.

In the accompanying illustration I have shown, more or less diagrammatically, certain embodiments of the present invention.

In this showing,

Figure 1 is a side elevation, partly in section, of my improved yieldable support as used in a wheel;

Fig. 2 is a cross sectional view on the line 2—2 of Fig. 1;

Fig. 3 is a fragmentary view of a modified form of my invention in which additional rocker links are interposed for coöperation with certain series of springs carried by the inner hub and outer rim sections;

Fig. 4 is a cross sectional view of the form shown in Fig. 3 on the line 3—3 of said figure;

Fig. 5 is a fragmentary view of another form of my invention wherein a different type of spring carried by the outer rim section is used; and Fig. 6 is a view in vertical section of another embodiment of my invention wherein the peripheral member is fixed and my yieldable support is used for engaging with a shaft, axle or other rotatable or vibrating member.

The present invention is designed for use in connection with various types of mechanisms requiring absorption of shock whether it be imparted from an outer contacting surface, or whether it be transmitted through the internal and immediate bearing support in which parts of the mechanism operate such as the stub end of a shaft and the like. It is particularly useful in connection with all forms of vehicle wheels requiring uniform resiliency under all conditions of load and shock, such as automobiles, railroad rolling stock, trucks, etc., but may also be used in all types of stationary machinery in which a yieldable bearing support is desirable.

As shown, my improved shock absorbing device comprises a more or less annular inner member 1. Opening 2 may be used for engaging an axle, shaft or any other member to be protected against shock. As shown in Figs. 1 and 2, the structure of the present invention is used as a wheel and the central opening may engage an axle. Of course where other methods of engagement are desired the opening may be dispensed with and the central member made solid, being then bolted or otherwise secured to the element to be cushioned. But ordinarily the central member is, as shown, made annular. The inner opening may be made large enough to receive any members or elements desired. Radially extending from this inner annular member are rigid arms or abutments 3 having depressions therebetween, making the whole member, as shown, of substantially star shape. If of metal, it may be cast in one piece or it may be built up or assembled in any of the usual ways. It may be made of wood, steel, iron or any other suitable material. Spaced outwardly somewhat from this inner annular member is an annular peripheral or rim section 4 located somewhat beyond the ends of the radially extending arms. Located between the radially extending arms are radially disposed rocker arms or plates 5, each movably keyed to the inner annular member. At the point of engagement with such inner annular member these rocker arms may be provided with heads 6 fitted into corresponding recesses. They may engage with a ball-and-socket or roller-and-socket engagement. These rocker arms may be held in position by means of keys 7 (best seen in Fig. 2). By this construction the rocker arms are permitted lateral or swinging motion circumferentially of the whole device, and at the same time are prevented from slipping out of engagement with the stated inner annular member. At their outer ends, these rocker arms or plates are provided with heads 8 adapted to engage at 9 with a lever member 10, which may be a spring, such as a leaf spring or may be a rigid body of metal or the like. Keys 11 (best shown in Fig. 2) serve to retain the heads of the rocker arms in position while at the same time permitting the swinging or oscillatory movement of such arms. These lever members are carried by the peripheral or rim section; and as shown have one end yieldingly secured thereto. The engagement may be, as shown, in recesses 12 permitting a degree of swinging movement. As shown, the engagement is similar to that of the rocker arms already described; that is, is a ball-and-socket or roller-and-socket engagement. This form of engagement is useful in uses where strains would be occasioned should the lever members be rigidly secured. Interposed between the lever members and the inner surface of the peripheral member or rim are springs 13. These springs may be, as shown in Fig. 1, coil springs of an ordinary type. It is best to use, as shown, a plurality of springs located in parallel groups. The number of these groups and the strength of the springs in them may be of course varied according to the amount of absorption of shock which may be necessary or desired. The springs may be kept in position by lugs 14 extending inward from the rim section. With other types of spring than coil springs, other methods of securing the springs to the rim may be used and these lugs dispensed with. As shown, these lugs extend inwardly a sufficient distance to give them another function; that of acting as abutments or, so to speak, bumper elements. Similar lugs 15 may be provided on the side of the lever members to aid in holding the springs in position, and may of course act as abutments engaging the lugs just mentioned.

By the use of these groups of springs it will be seen that any shock imparted to either the annular member or to the outer peripheral member, as the case may be, will be transmitted through the rocker arms and the lever members in a substantially radial direction, thereby producing a uniform resiliency between said peripheral or rim member and said inner or annular member.

I find it useful to provide further a series of lateral cushioning springs 16 engaging the sides of the rocker arms or plates and limiting their swinging movement. These springs may be held in position by suitable lugs 17 and 18 which, like the lugs already described, may also act as bumper or abutment members.

In the structure of Figs. 1 and 2 the described elements are shown as functioning in a wheel. The inner annular member may receive the axle of a vehicle and the outer or rim member may be the road-engaging rim of an ordinary road wheel; or the portion of the wheel adapted to receive the usual pneumatic or other tires. Or the whole device as shown may be used as a hub of a wheel, in which event the outer or rim portion just described is provided with spokes, etc. The whole shock absorbing mechanism may be inclosed in side walls 19 which may be bolted in place.

In Figs. 3 and 4 the elements are substantially the same as those already described for Figs. 1 and 2, and are also shown as mounted for use in a wheel, but in this view the lever members are shown provided with additional cushioning means. These means comprise certain springs 20 located between abutments or lugs 21 in the inner or annular member and cross bars or floating lugs 22. The latter are connected to the outer end of the lever members by means of rocker links 23. To receive these additional springs, recesses 24 are formed in the inner or annular member. The inner or annular member may also be slotted at 25 (see Fig. 4) to give free movement to said rocker links. The additional springs and link connections also serve to absorb shock.

In the structure of Fig. 5, which is also shown as a wheel, the structure is varied by substituting for the outer groups of coil springs engaging the lever arms, an extension of the lever arm, making the lever arm and extension of resilient material. As shown, in this figure the lever arm 26 pivoted or yieldingly connected at 27, has a bent or curved portion 28 which engages the inner surface of the rim member through rolling or sliding contact 29.

In the structure of Fig. 6 the elements are exactly the same as in the structure of Fig. 1 save that the outer or rim member instead of being a wheel or the like is stationary. As shown, it is rigidly mounted on foot 30 and the inner or annular member is provided with journal opening 31 which may serve to receive a rotating or vibrating member to be cushioned. It may, for example, receive the end of a rotating shaft or any other element to be cushioned, such as the supporting members of shaking sieves and the like. Or the structure as shown may be used in giving resiliency to vehicles, the element 30 being then secured to the body of the vehicle while an axle of a wheel passes through 31. Or, element 30 may engage the axle journal and the structure be suitably secured at 31 to the vehicle body.

It will be obvious that the present invention comprises a compact and readily convertible shock absorbing device capable of evenly distributing all shocks.

With the side plate shown, the whole structure is so inclosed that it is dust proof and readily retains any desired amount of lubricating oil. It may be kept substantially full of oil.

What I claim is:—

1. In a yielding bearing, an inner bearing member having radial abutments, an outer member concentric therewith, and intermediate yieldable means connecting said annular members, said means comprising radially disposed arms pivotally connected at one end to the inner of said members and arranged between said radial abutments, and lever devices pivotally secured to the other end of said radially disposed arms, one end of said lever devices engaging said outer member.

2. In a yielding bearing, an inner bearing member having radial abutments, an outer member concentric therewith, and intermediate yieldable means connecting said annular members, said means comprising radially disposed arms pivotally connected at one end to the inner of said members and arranged between said radial abutments, and lever devices pivotally secured to the other end of said radially disposed arms, one end of said lever devices engaging said outer member.

3. In a yielding bearing, an inner bearing member having radial abutments, an outer member concentric therewith, and intermediate yieldable means connecting said annular members, said means comprising radially disposed arms pivotally connected at one end to the inner of said members and arranged between said radial abutments, and lever devices pivotally secured to the other end of said radially disposed arms, one end of said lever devices engaging said outer member, and spring members cushioning said lever devices and interposed between said lever devices and said outer member.

4. In a yielding bearing, an inner bearing member having radial abutments, an outer member concentric therewith, and intermediate yieldable means connecting said annular members, said means comprising radially disposed arms pivotally connected at one end to the inner of said members and arranged between said radial abutments, and lever devices pivotally secured to the other end of said radially disposed arms, one end of said lever devices engaging said outer member, and coil spring members cushioning said lever devices and interposed between said lever devices and said outer member.

5. In a yielding bearing, a pair of concentric annular members, the inner member having a plurality of rigid arms projecting therefrom, and intermediate yieldable means connecting said annular members, said means comprising radially disposed arms pivotally connected at one end to the inner of said members, lateral spring members arranged between said radially disposed arms and said rigid arms, lever devices pivotally secured to the opposite end of said radially disposed arms, one end of said lever devices engaging the said outer member, and coil spring members interposed between said lever devices and said outer member.

6. In a yielding bearing, a pair of concentric annular members, the inner member having a plurality of rigid arms projecting therefrom, and intermediate yieldable means connecting said annular members, said means comprising radially disposed arms pivotally connected at one end to the inner of said members, lateral spring members arranged between said radially disposed arms and said rigid arms, lever devices pivotally secured to the opposite end of said radially disposed arms, one end of said lever devices engaging the said outer member, and coil spring members interposed between said lever devices and said outer member.

7. In a shock absorbing mechanism, an internal bearing support provided with radial abutments, an outer rim section spaced from the said bearing support and provided with a plurality of lever members, movable rocker arms connecting said lever members to the internal bearing support, a plurality of springs interposed between the said movable rocker-arms and the aforesaid radial abutments, and another set of springs interposed between the aforesaid lever members and the outer rim section.

8. In a shock absorbing mechanism, an internal bearing support provided with radial abutments, an outer rim section spaced from the said bearing support, a plurality of rocker-arms movably connected to the said internal bearing support, a series of springs interposed between the said rocker-arms and the aforesaid radial abutments, and means including a plurality of lever members connected to the said rocker-arms and outer rim sections for absorbing shocks.

9. In a shock absorbing mechanism, an internal bearing support provided with radial abutments, an outer rim section spaced from the said bearing support and provided with a plurality of lever members, movable rocker arms connecting said lever members to the internal bearing support, a plurality of laterally disposed springs positioned between the said movable rocker arms and the aforesaid radial abutments, another set of springs interposed between the aforesaid lever members and the outer rim section, and an additional set of springs connected to the aforesaid lever members.

10. In a shock absorbing mechanism, an internal bearing support provided with radial abutments, an outer rim section spaced from the said bearing support, a plurality of rocker arms movably connected to the said internal bearing support, a series of springs interposed between the said rocker arms and the aforesaid radial abutment, and a plurality of lever members connected to the said rocker arms and having one end thereof movable with respect to the outer rim section.

11. In a yielding bearing, an inner bearing member having radial abutments, an outer annular member, and intermediate yieldable means connecting said members, said means comprising radially disposed arms pivotally connected at one end to the inner of said members and arranged between said radial abutments and lever devices pivotally secured to the opposite end of said radially disposed arms, one end of said lever devices engaging said outer member.

12. In a yielding bearing, a pair of concentric members, the outer member being annular, and intermediate yieldable means connecting said members, said means comprising radially disposed arms pivotally connected at one end to the inner of said members, lever devices pivotally secured to the opposite ends of the radially disposed arms, one end of said lever devices engaging the outer member, spring members cushioning said lever devices and lateral spring members cushioning said radially disposed arms.

13. In a yielding bearing, a pair of concentric members, the outer member being annular, and intermediate yielding means connecting said members, said means comprising radially disposed arms pivotally connected at one end to the inner of said members, lever devices pivotally secured to the opposite ends of the radially disposed arms, one end of said lever devices engaging the outer member, spring members cushioning said lever devices and interposed between said lever devices and said outer member, and lateral spring members cushioning said radially disposed arms.

14. In a yielding bearing, a pair of concentric members, the outer member being annular, and intermediate yieldable means connecting said members, said means comprising radially disposed arms pivotally connected at one end to the inner of said members, lever devices pivotally secured to the opposite ends of the radially disposed arms, one end of said lever devices engaging the outer member, coil spring members cushioning said lever devices and interposed between said lever devices and said outer member, and lateral spring members cushioning said radially disposed arms.

15. In a shock absorbing device, an internal bearing support provided with radial abutments, an outer rim section spaced from said bearing support, radially disposed arms pivoted to the bearing support, lever devices engaging said rim section at one end and pivotally secured to said radially disposed arms, and a plurality of springs interposed between the radially disposed arms and said radial abutments.

16. In a shock absorbing device, an internal bearing support provided with radial abutments, an outer rim section spaced from said bearing support, radially disposed arms pivoted to the bearing support, yieldable means connecting said radially disposed arms to the rim section and a plurality of springs interposed between the radially disposed arms and said radial abutments.

In testimony whereof I affix my signature.

ELLERY M. CRUTHERS.

Copies of this patent may be obtained for five cents each, by addressing the "Commissioner of Patents, Washington, D. C."